(12) United States Patent
Sylvia

(10) Patent No.: US 6,408,631 B1
(45) Date of Patent: Jun. 25, 2002

(54) WAVE SPRING LOADED SPLIT SEAL SYSTEM

(75) Inventor: Russell Sylvia, South Dartmouth, MA (US)

(73) Assignee: Helix Technology Corporation, Mansfield, MA (US)

( * ) Notice: Subject to any disclaimer, the term of this patent is extended or adjusted under 35 U.S.C. 154(b) by 0 days.

(21) Appl. No.: 09/780,026

(22) Filed: Feb. 9, 2001

(51) Int. Cl.[7] .................................................. F25B 9/00
(52) U.S. Cl. ........................... 62/6; 29/888.07; 60/520; 277/902
(58) Field of Search .................. 62/6; 60/520; 277/902; 29/888.07

(56) References Cited

U.S. PATENT DOCUMENTS

| | | |
|---|---|---|
| 101,724 A | 4/1870 | French |
| 1,151,265 A | 8/1915 | Haggard |
| 1,336,670 A | 4/1920 | Anderson |
| 1,826,597 A | 10/1931 | Brecht |
| 2,534,123 A | 12/1950 | Hasselhorn ............... 148/21.55 |
| 2,982,323 A | 5/1961 | Vossloh et al. ................ 151/38 |
| 3,364,675 A | 1/1968 | Dorer ............................ 60/24 |
| 3,406,979 A | 10/1968 | Weber .......................... 277/80 |
| 3,674,251 A | 7/1972 | Tirabassi ..................... 267/162 |
| 3,836,159 A | 9/1974 | Dryer ......................... 277/180 |
| 4,355,519 A | 10/1982 | Kercheval et al. ................ 62/6 |
| 4,402,186 A * | 9/1983 | Feustel et al. .................... 62/6 |
| 4,463,957 A | 8/1984 | Nagai et al. ................... 277/34 |
| 4,642,995 A | 2/1987 | Bächler et al. ................... 62/6 |
| 4,836,094 A * | 6/1989 | Meijer et al. ................ 277/902 |
| 4,901,987 A | 2/1990 | Greenhill et al. ............ 267/166 |
| 5,240,263 A | 8/1993 | Nicholson .................... 277/236 |
| 5,433,456 A | 7/1995 | Nicholson .................... 277/236 |
| 5,551,709 A | 9/1996 | Plunkett .................. 277/235 B |
| 5,558,393 A | 9/1996 | Hawkins et al. ............. 267/162 |
| 5,570,891 A | 11/1996 | De Villepoix et al. ....... 277/117 |
| 5,639,074 A | 6/1997 | Greenhill et al. ............ 267/162 |
| 5,803,444 A | 9/1998 | Shibuya et al. .............. 267/180 |
| 5,911,295 A | 6/1999 | Itonaga et al. ............ 192/70.28 |
| 5,956,956 A * | 9/1999 | Morishita et al. ................ 62/6 |
| 6,039,325 A | 3/2000 | Steinetz et al. .............. 277/633 |
| 6,098,989 A | 8/2000 | Caplain et al. .............. 277/541 |
| 6,145,841 A | 11/2000 | Maeda ......................... 277/358 |
| 6,256,997 B1 * | 7/2001 | Longsworth ...................... 62/6 |

FOREIGN PATENT DOCUMENTS

| | | |
|---|---|---|
| EP | 0 396 775 A1 | 11/1990 |
| FR | 996943 | 6/1965 |

* cited by examiner

*Primary Examiner*—Ronald Capossela
(74) *Attorney, Agent, or Firm*—Hamilton, Brook, Smith & Reynolds, P.C.

(57) ABSTRACT

A piston includes a circumferential groove having a seal ring and spring mounted within the groove. The spring exerts an axial force on the seal ring thereby preventing motion of the seal ring within the groove. Preferably, the spring in a wave spring, wherein small changes in deflection of the wave spring produces small changes in the load generated by the spring on the seal ring. The seal ring has at least one radial spring ring mounted within the seal ring to create a radial force on the seal ring. The piston can also include a sleeve that mounts to the piston body, the sleeve forming a wall of the groove. The piston can be a displacer mounted within a cylinder of a refrigerator.

47 Claims, 10 Drawing Sheets

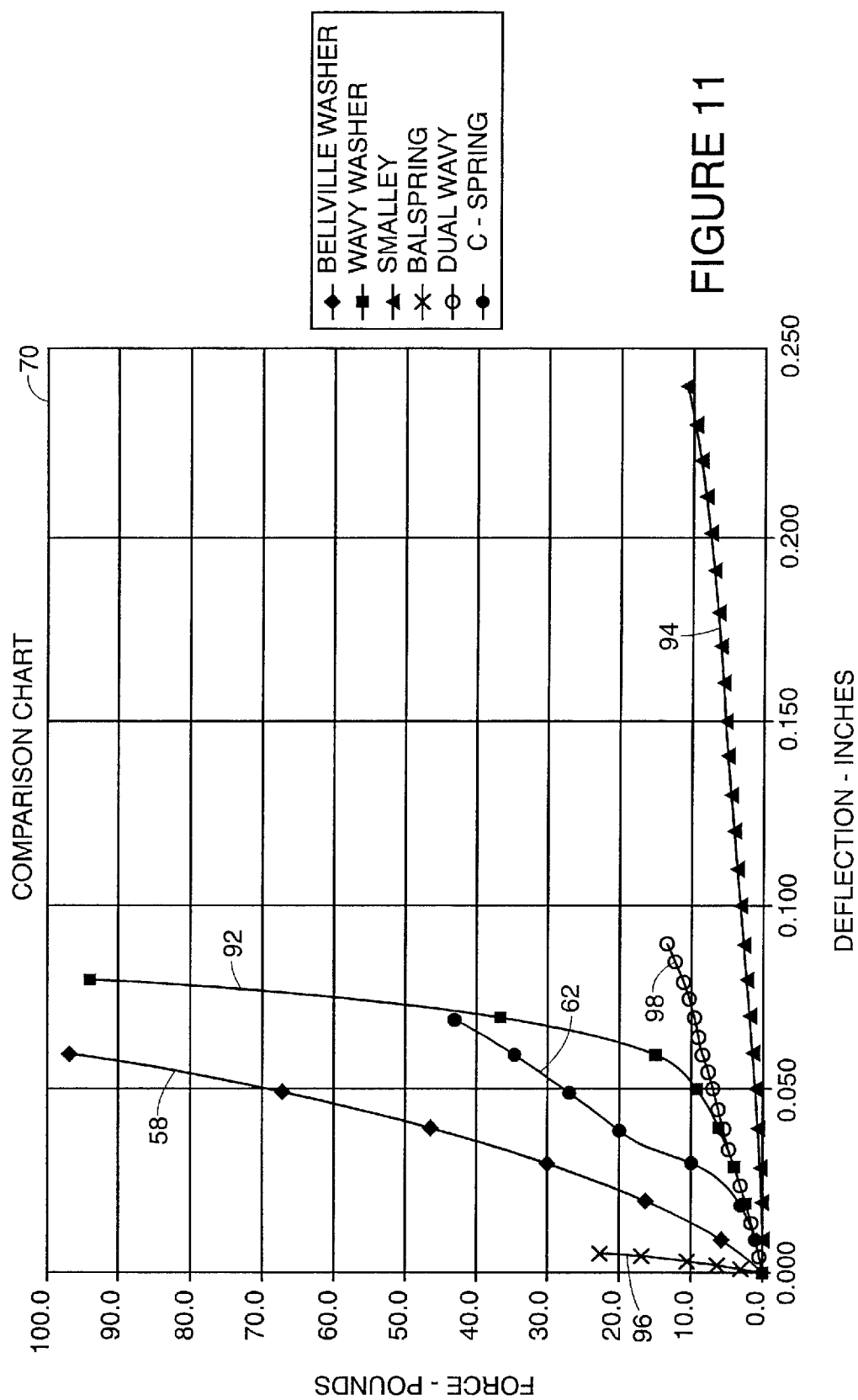

WAVE SPRING LOADED SPLIT SEAL SYSTEM

BACKGROUND OF THE INVENTION

In cryogenic refrigerators such as Stirling and Gifford-MacMahon type refrigerators, a piston-like displacer reciprocates within a cylinder. For efficient refrigeration in those two systems, a gas seal is provided between the displacer and cylinder to assure that refrigerant passing from one end of the displacer to the other passes through a regenerator in the displacer. The seal also provides a braking action on displacer movement. One type of seal which has been widely used in such refrigerators is the split ring seal having a Z-cut there across to permit circumferential expansion of the ring without loss of sealing. The seal is positioned in a circumferential groove in the displacer and is pressed outward against the cylinder by an inner expander ring. When assembled, the split seal fits snugly within the groove. A primary advantage of such a seal in cryogenic refrigerators is that, even with wear and thermal contraction or expansion of the seal, the expander assures a fairly constant braking force on the displacer movement.

As shown in FIG. 1, a typical split Gifford-MacMahon or Stirling refrigerator includes a displacer 12 which reciprocates in a cylinder 14. The displacer is driven by a motor or gas spring volume through a piston rod 13 and pin connection 15. Upward movement of the displacer 12 causes high pressure gas in a warm chamber 16 to be displaced through a regenerator 18 within the displacer. The gas passes outward through a porous metal plug 20 or side ports (not shown) into a cold end expansion chamber 24. The thus cooled gas is expanded in the chamber 24 to further cool the gas surrounding high conductivity heat station 26. Then, with downward movement of the displacer the very cold gas is returned through the regenerator 18 to cool that regenerator for cooling of gas in the next cycle of operation. To assure that all refrigerant, such as helium gas, is directed through the regenerator with movement of the displacer, the seal ring 28 is positioned in a peripheral groove in the displacer near its warm end.

The seal ring 30 is generally of plastic material such as fiber glass tetrafluoroethylene (TFE), whereas the expander ring is of spring steel and the groove is usually formed in stainless steel. Thus, the seal ring 30 has a much greater coefficient of thermal expansion than do the surrounding metal parts. To allow for thermal expansion of the seal ring within the groove, rings in conventional refrigerators have a slightly smaller axial dimension than that of the groove to within 0.5 mils. Thus, except when operating at high temperatures, the seal ring shuttles within the groove along the expander ring with each change in direction of the displacer movement. During the time intervals that the seal is shifting within the groove, there is no compressive force to maintain a tight seal along a circumferential cut or Z-cut in the seal ring 30 and at a groove face. Thus, leakage is experienced with each change in direction of the displacer. Also, the seal ring must alternately seal against opposite faces of the groove. For this sealing, the faces of the seal ring and the groove must be precisely smooth, flat and parallel. Such necessary precision, makes large scale fabrication of consistently and uniformly operating devices difficult.

When the refrigerator is exposed to a cold environment, or the seal is cooled by the refrigerator itself, the seal ring shrinks and, as a result, shuttles to a greater extent along the expander ring with each reciprocating movement of the displacer. Such shuttling of the seal within the groove results in greater wear and leakage. The wear of the seal ring leads to even greater leakage around the displacer and also gives rise to debris which, when mixed with the helium refrigerant, reduces the efficiency of the refrigerator.

In U.S. Pat. No. 4,355,519, herein incorporated by reference, shuttling of the seal was prevented by the use of a spring within the displacer. The use of a Belleville washer and an annular spring having a u-shaped or c-shaped cross section were described.

SUMMARY OF THE INVENTION

FIG. 2 illustrates a graph 56 of a force-deflection curve 58 for a Belleville washer. Similarly, FIG. 3 illustrates a graph 60 of a force-deflection curve 62 for a u-shaped or c-shaped spring. The graphs 56, 60 illustrate that for both the Belleville washer and the c-shaped spring, small changes in deflection of the spring leads to large changes in the loads generated by the springs. Thus, with the Belleville washer and c-shaped spring, it is difficult to displace the springs and generate a force on the seal ring within a narrow load tolerance. Furthermore, because portions of the piston shrink with exposure to a cold environment, such shrinkage can cause small displacements on the Belleville washer and c-shaped spring. These displacements, while small, can drastically affect and change the loads generated by the springs. Maintaining a load on the seal ring within an acceptable tolerance level is difficult to achieve using the aforementioned springs.

Preferably, a spring used in a piston has a force-deflection relationship such that small changes in the deflection of the spring produce small changes in the load produced by the spring on the seal ring. The loads generated by the spring can therefore be obtained and held within a narrow range or tolerance. Preferably, the spring is a wave spring such as a spiral wave spring (Smalley Ring Co., Wheeling, Ill.) or at least one wavy washer (Smalley Ring Co., Wheeling, Ill.). For example, two wavy washers can be stacked vertically to form a dual wavy washer.

One embodiment of the invention includes a piston having a body with a circumferential groove, a seal ring and a wave spring. The groove includes a first groove wall and a second groove wall. The seal ring is located against the first groove wall in the body. The wave spring is located between the seal ring and the second groove wall where the wave spring axially loads the seal ring.

The piston can be used as a displacer within a refrigerator. The seal ring is preferably a split seal ring and includes at least one radial spring mounted within the seal ring to create a radial force within the seal ring. Preferably, the at least one radial spring includes a first radial spring and a second radial spring. The first radial spring includes a first opening and the second radial spring includes a second opening. The first radial spring and the second radial spring are mounted within the seal ring such that the first opening is located at approximately 180 degrees with respect to the second opening. In one embodiment, the piston includes a load ring mounted between the wave spring and the seal ring. The load ring distributes the axial load created by the wave spring onto the seal ring.

In another embodiment, the piston includes a sleeve mounted on the body where the sleeve forms the first groove wall of the circumferential groove and the body forming the second groove wall of the circumferential groove. The piston can also include a securing mechanism that secures the sleeve to the body such as a snap ring.

Another embodiment of the invention includes a refrigerator having a cylinder and a displacer mounted within the cylinder. The displacer includes a body with a circumferential groove, a seal ring and a spring. The groove includes a first groove wall and a second groove wall where the seal ring is located against the first groove wall in the body and the spring is located between the seal ring and the second groove wall, the spring axially loading the seal ring. The body can include a sleeve mounted on the body where the sleeve forms the first groove wall and the body forms the second groove wall. The spring can include a wave spring which axially loads the seal ring. The seal ring can include a split seal ring having at least one radial spring mounted within the split seal ring to create a radial force of the split seal ring against the cylinder.

An embodiment of the invention also relates to a method for securing a seal ring within a piston.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 11 illustrates the force-deflection curves for various types of springs.

DETAILED DESCRIPTION OF THE INVENTION

A description of preferred embodiments of the invention follows.

Figure 1:
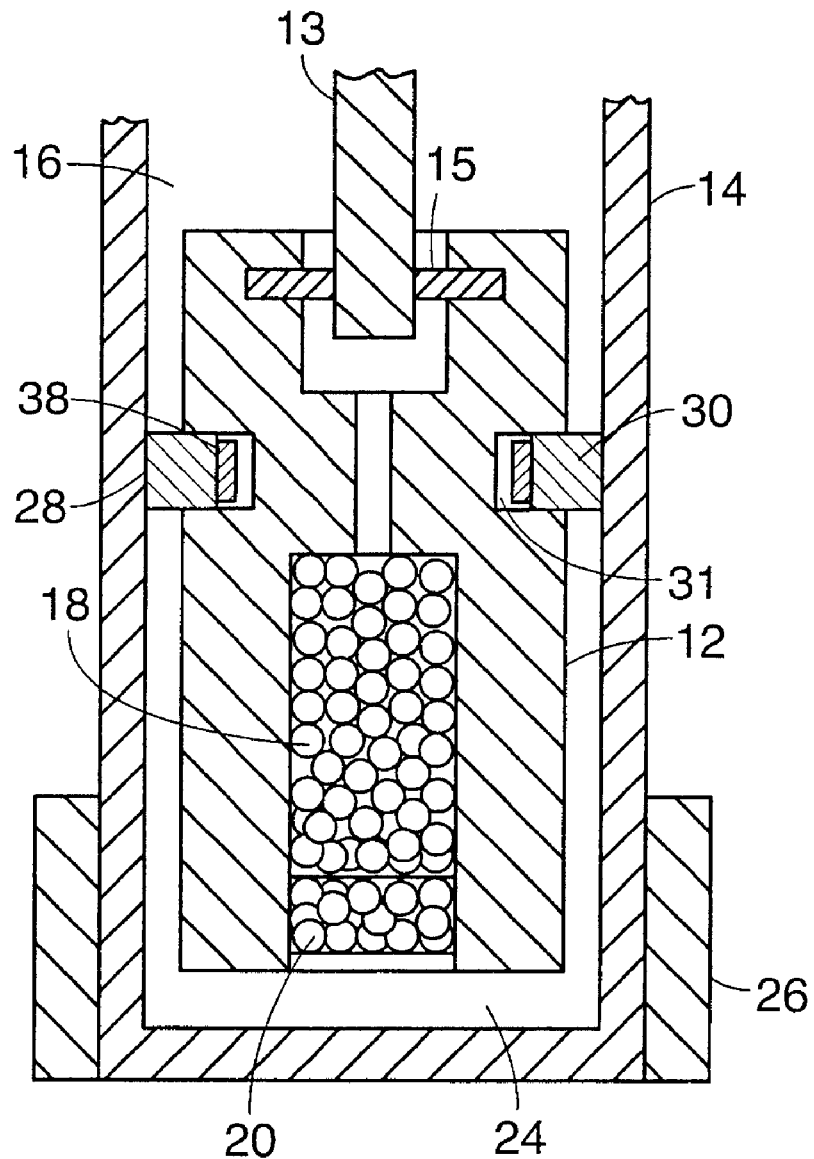
FIG. 1 illustrates a cross-sectional view of a displacer within a cylinder.
Figure 2:
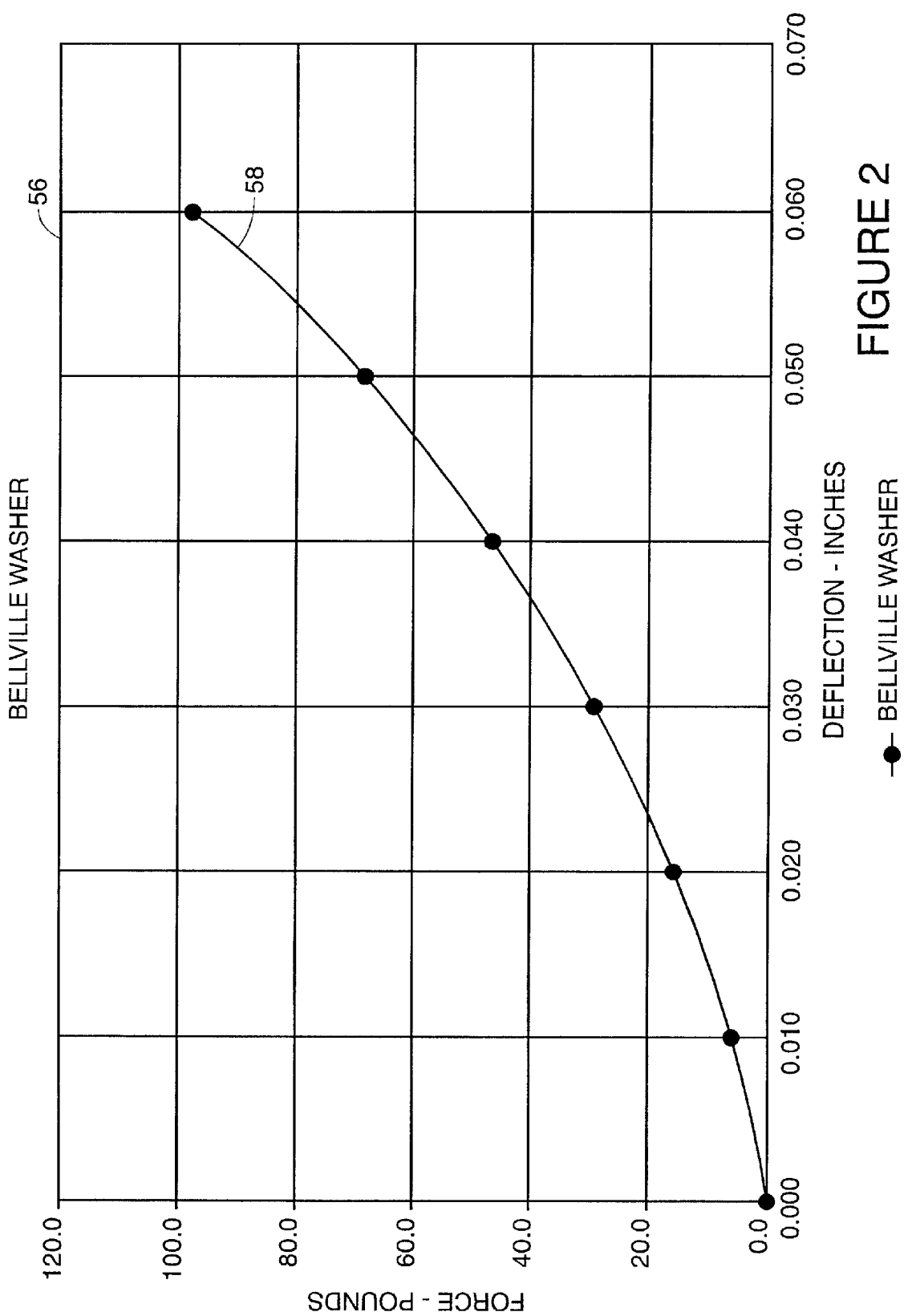
FIG. 2 illustrates a force-deflection curve for a Belleville washer.
Figure 3:
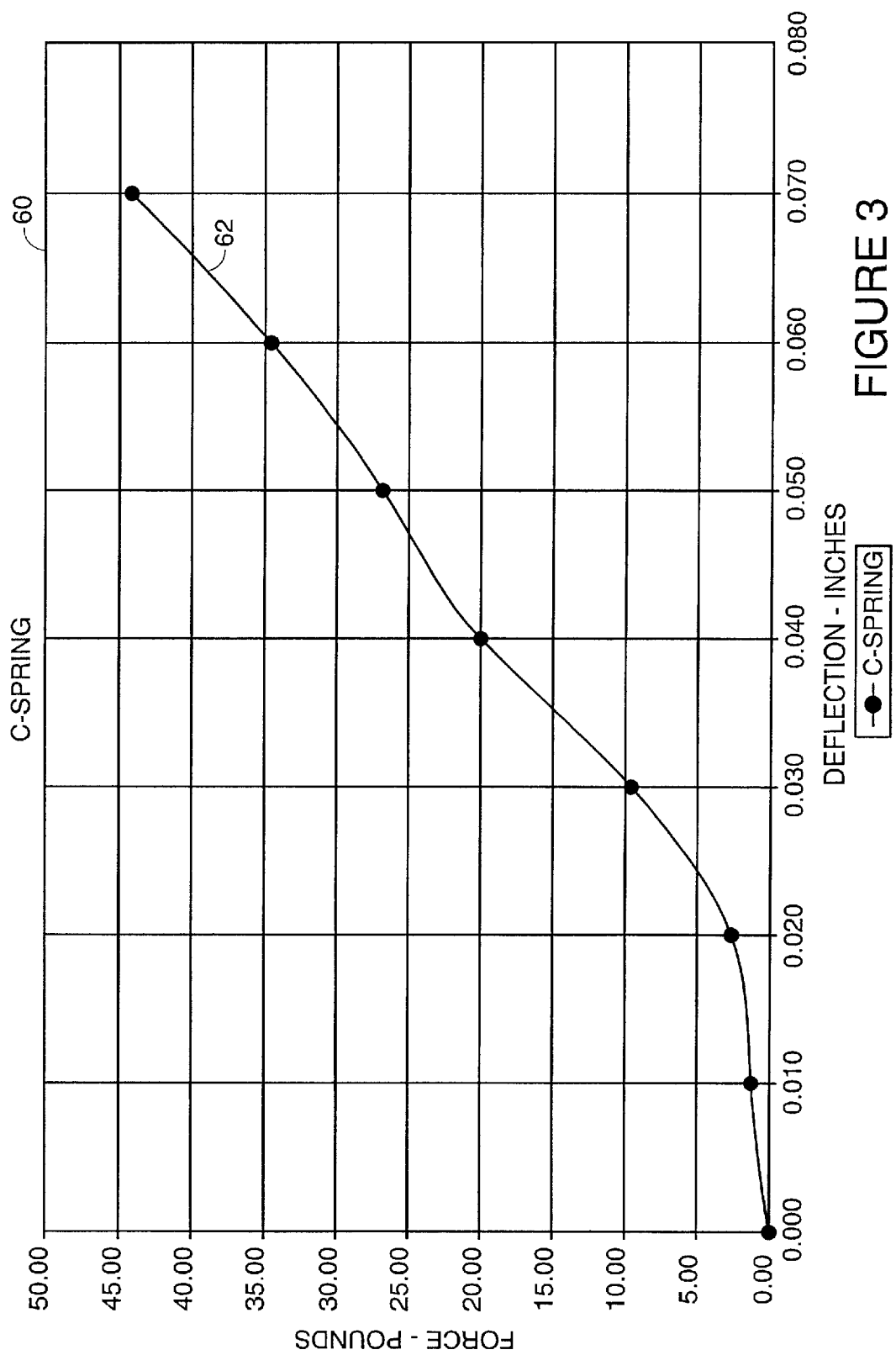
FIG. 3 illustrates a force-deflection curve for a c-shaped spring.
Figure 4:
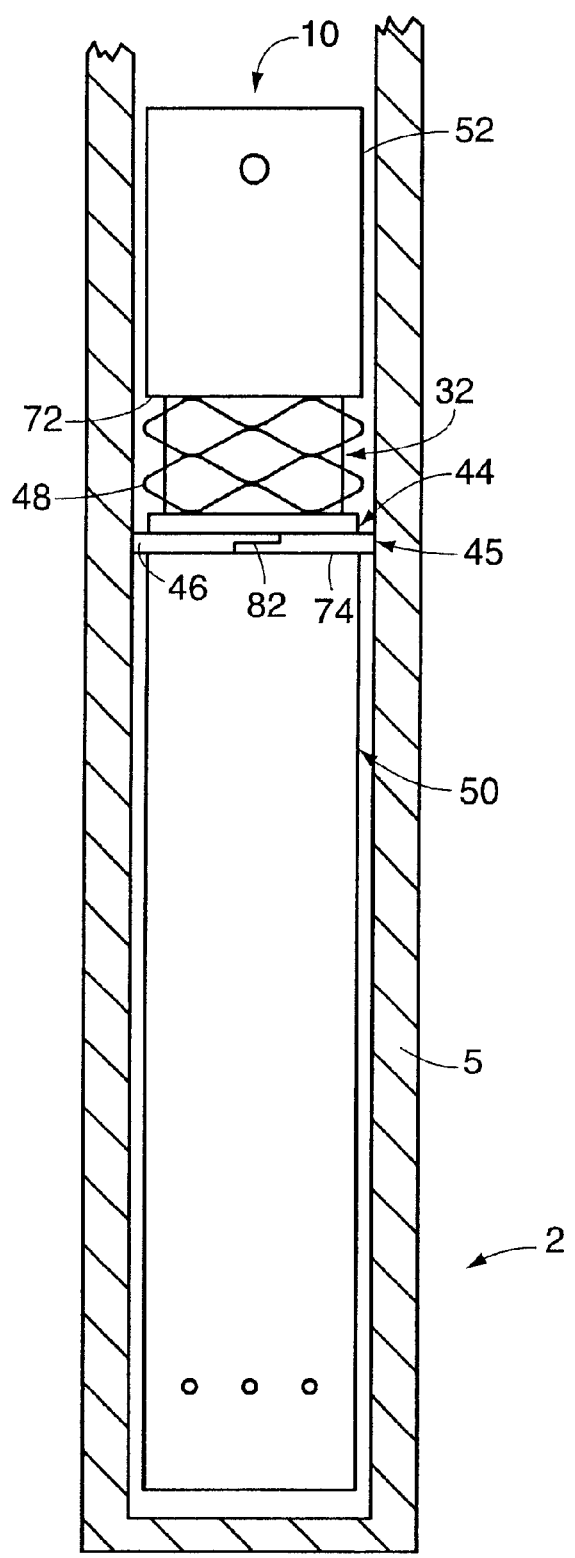
FIG. 4 illustrates a displacer.

FIG. 4 illustrates an embodiment of a piston given generally as 10. Preferably, the piston 10 is a displacer, such as is used in a cryogenic refrigerator. FIG. 4 illustrates the piston 10 located within a cylinder 5 of a refrigerator 2. The piston 10 includes a body 50 having a circumferential groove 32. The circumferential groove 32 includes a first groove wall 72 and a second groove wall 74 formed in the body 50. The piston 10 also includes mounted within the groove 32, a seal ring 46, at least one radial spring, a load ring 44 and an axial biasing mechanism such as a spring 48. The design of the piston 10 allows a user to displace the spring 48 such that the spring 48 loads the seal ring 46 within a narrow load range or tolerance.

Figure 5:
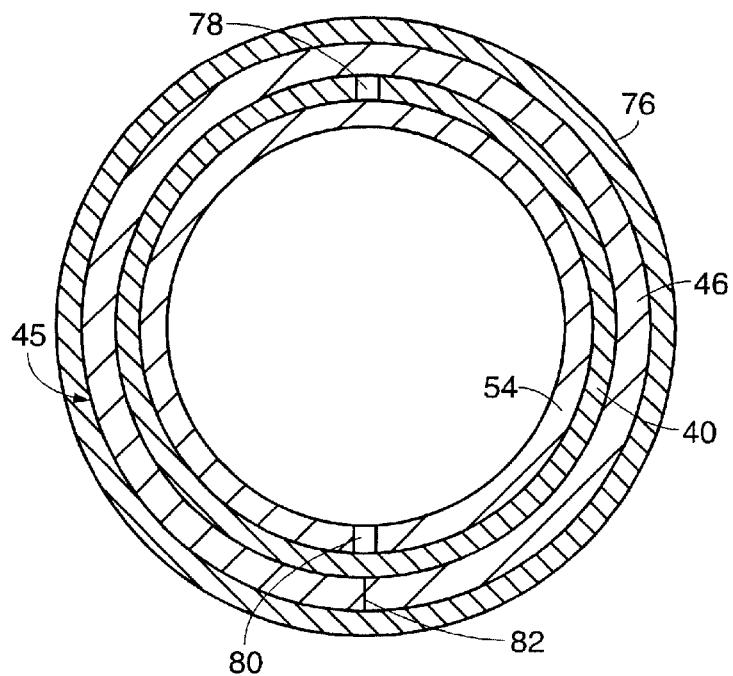
FIG. 5 illustrates a seal ring assembly mounted within a support ring.
Figure 6:
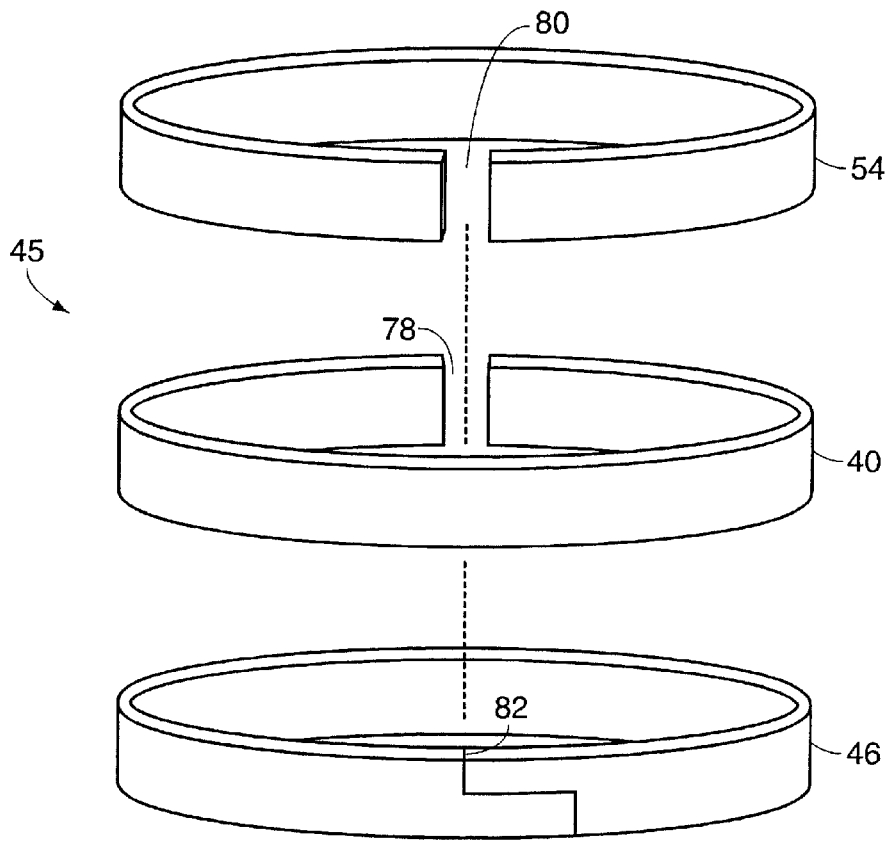
FIG. 6 illustrates an exploded view of the seal ring assembly.

The seal ring 46 is preferably a split seal ring having a z-cut 82 to allow for circumferential expansion of the seal 46. As is illustrated in FIGS. 5 and 6, the at least one radial spring preferably includes a first radial spring 54 and a second radial spring 40. FIG. 5 illustrates a seal ring assembly 45 wherein the first radial spring 54, the second radial spring 40 and the seal ring 46 are in an assembled state. FIG. 6 illustrates an exploded view of the seal ring assembly 45. A support ring 76 mounts adjacent to and compresses the seal ring 46 and radial springs 54, 40 along a radial direction to allow the assembly 45 to be mounted to the piston 10 prior to assembly in a cylinder.

To assemble the components 46, 54, 40 of the assembly 45, the seal ring 46 is first placed within the support ring 76. The second radial spring 40 is then placed within the seal ring 46. The second radial spring 40 is formed in a c-shaped cross-section of a material that produces an expanding force on the seal ring 46. The second radial spring 40 includes a opening or gap 78 between its free ends that allows for the expansion of the spring 40. Next, the first radial spring 54 is placed within the second radial spring 40. Similar to the second radial spring 40, the first radial spring 54 is formed in a c-shaped cross section of a material that produces an expanding force on the seal ring 46. The first radial spring 54 also includes an opening 80 between its free ends, allowing the spring to expand. Preferably, the first radial spring 54 is positioned within the second radial spring 40 such that the opening 80 of the first radial spring 54 is located approximately 180 degrees opposite to the opening 78 of the second radial spring 40. Positioning of the first 54 and second 40 radial springs in this manner causes the radial force created by the first radial spring 54 to balance against the radial force generated by the second radial spring 40, thereby producing an approximately uniform radial load within the seal ring 46. The radial force generated by the radial springs 54, 40 is transmitted to the seal ring 46 thereby causing the seal ring 46 to expand. Furthermore, positioning the openings of the first 54 and second 40 radial springs at approximately 180 degrees relative to each other prevents rotation of the seal ring 46 about the long axis of the piston 10 during translation of the piston.

As shown in FIG. 4, the piston 10 mounts within the cylinder 5 of the refrigerator 2 without support ring 76. The radial expansion of the seal ring 46 created by the spring rings 54, 40 forces the seal ring 46 against the wall of the cylinder 5. The expansion of the seal ring 46 creates a seal within the cylinder 5 to separate cold and warm gas volumes located above and below the seal ring 46, respectively.

After being assembled, the seal ring assembly 45 and support ring 76 are placed within the groove 32 against the second groove wall 74 of the body 50. Once the seal assembly is placed in the groove 32 of the piston 10, the displacer is slid into the cylinder and the support ring 76 is simultaneously slid from the seal ring assembly 45 to allow expansion of the radial springs 54, 40 and the seal ring 46 against the cylinder 5.

The piston 10 includes a spring 48 that is placed adjacent to the seal ring 46. Preferably, the spring 48 is a wave spring, such as a spiral wave spring (Smalley Ring Co., Wheeling, Ill.), a wavy washer (Smalley Ring Co., Wheeling, Ill.) or a dual wavy washer. Also preferably, the spring 48 produces an axial load of between 5 and 10 pounds force on the seal ring 46 when placed within the groove of the piston. This load prevents axial motion of the seal ring 46 on the piston 10.

Figure 7A:
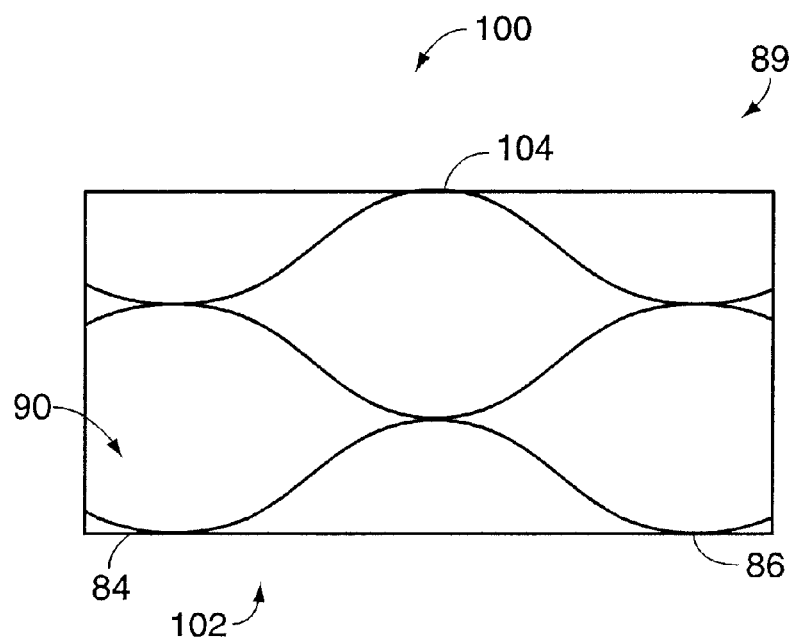
FIGS. 7A and 7B show a front and rear view, respectively, of a spiral wave spring.
Figure 7B:
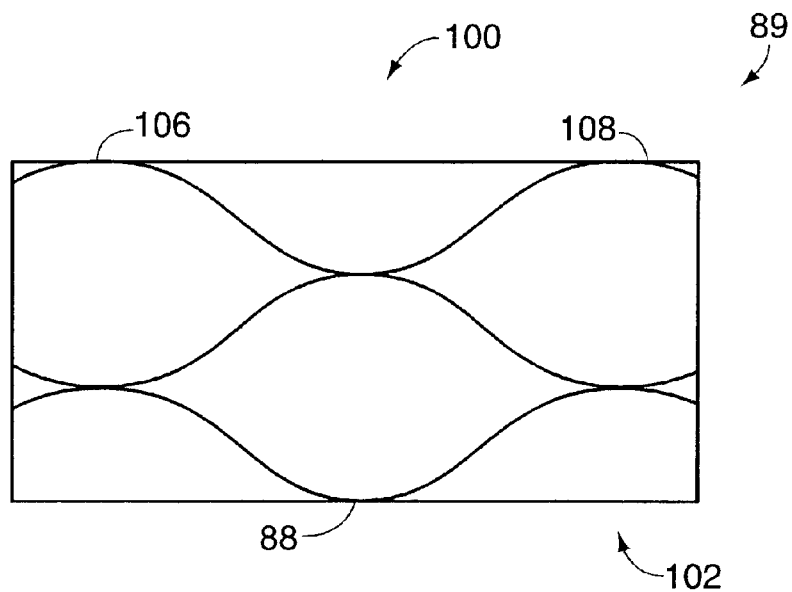

FIGS. 7A and 7B illustrate a front and rear view, respectively, of the spiral wave spring 89. Around the circumference of the spiral wave spring 89, through 360 degrees, the spring 89 includes a plurality of waves or lobes 90. The contact points of the waves 90 distribute the axial load generated within the spring 89 to structures adjacent the spring 89, such as the seal ring 46 and first groove wall 72. The waves 90 act as a plurality of leaf springs, thereby allowing a greater control on the amount of load produced by the spring 89, relative to the amount of deflection of the spring 89, as compared to other types of springs.

The spiral wave spring 89 includes a first end 100 and a second end 102. Preferably, the spiral wave spring 89 includes three lobes or contact points for each end 100, 102. The first end 100 of the spiral wave spring 89 includes a first lobe 104, a second lobe 106 and a third lobe 108. The second end 102 similarly includes a first lobe 84, a second lobe 86 and a third lobe 88. The lobes 84, 86, 88 of the second end 102 of the spring 89 contact the seal ring 46 in the piston 10. The lobes 104, 106, 108 of the first end 100 of the spring contact the first groove wall 72 of the piston 10. The lobes 84, 86, 88 and 104, 106, 108 distribute the load created within the spring 89 to these adjacent structures. Alternately, the spiral wave spring 89 can include four or five lobes or contact points at each end 102, 100 of the spring 89, within the 360 degrees of the circumference of the spring 89. An increased number of lobes or contact points provides a more uniform distribution of the load created in the spring 89.

Figure 7C:
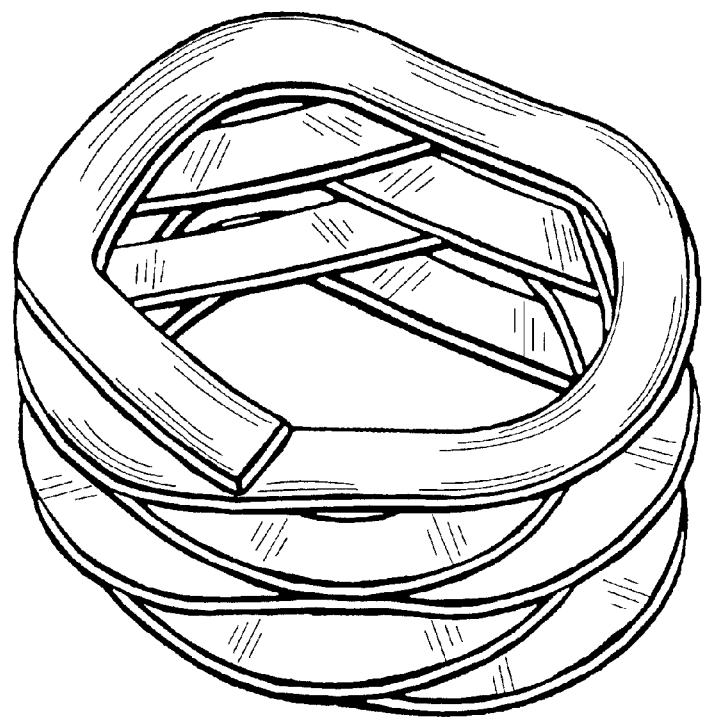
FIGS. 7C and 7D illustrate embodiments of a spiral wave spring

FIGS. 7B and 7C illustrate two types of spiral wave springs 89. FIG. 7C illustrates a spiral wave spring 120 having a first end 122 and a second end 124 where the first 122 and second 124 ends are non-flat. The spiral wave spring 120 is made from a single strip of material, preferably metal, such that the spring 120 is formed in a wave pattern having multiple layers 126 with a plurality of nodes or lobes 128. The nodes 128 of each subsequent layer are out of phase by 180 degrees with respect to the nodes 128 of each previous layer. When the spiral wave spring 120 is placed between two parallel planes, the nodes 128 of the spiral spring wave 120 are in direct contact with the planes.

Figure 7D:
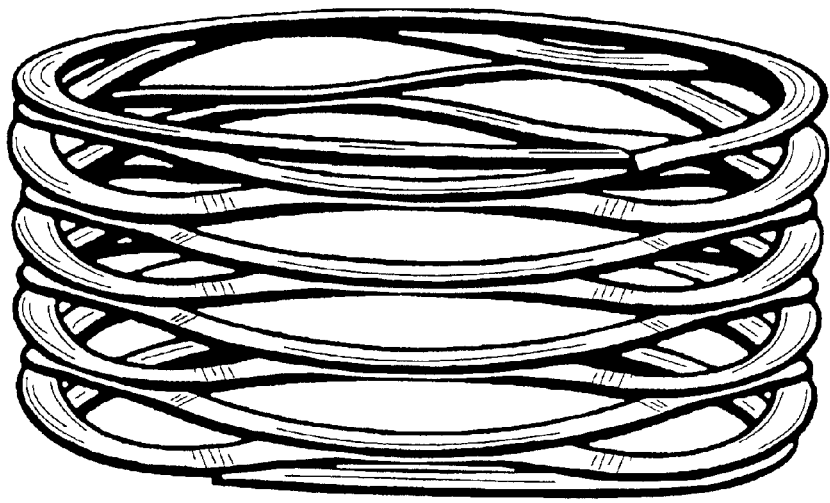

FIG. 7D illustrates a spiral wave spring 130 having a first end 132 and a second end 134 where the first 132 and second 134 ends are flat. The spiral wave spring 130 is made from a single strip of material, preferably metal, such that the final turn at each end 132, 134 of the spring 130 is formed to be flat while the central portion of the spring is formed in a wave pattern. Similar to the spiral wave spring 120 in FIG. 7C, the wave pattern of spiral wave spring 130 includes multiple layers 136 having a plurality of nodes or lobes 138 where the nodes 138 of each subsequent layer are out of phase by 180 degrees with respect to the nodes 138 of each previous layer When the spiral wave spring 130 is placed between two parallel planes, the flat ends of the spiral spring wave 130 are in direct contact with the planes.

A load ring 44 can be inserted between the spring 48 and seal ring 46 on the piston 10. The load ring 44 includes a flat circular surface that distributes the axial load generated by the spring 40 onto the seal ring 46. Because the force generated by the spring 48 can be inconsistent along its circumference, the load ring 44 is used to reduce the inconsistencies in the load generated by the spring 48 and transmitted to the seal ring 46. Alternately, the spring 48 can include a flat, circular ring, similar to the load ring 44, that is formed integrally with the spring 48 at one or both ends. The integral ring also acts to distribute loads from the spring 48 onto the seal ring 46.

Figures 8, 9:
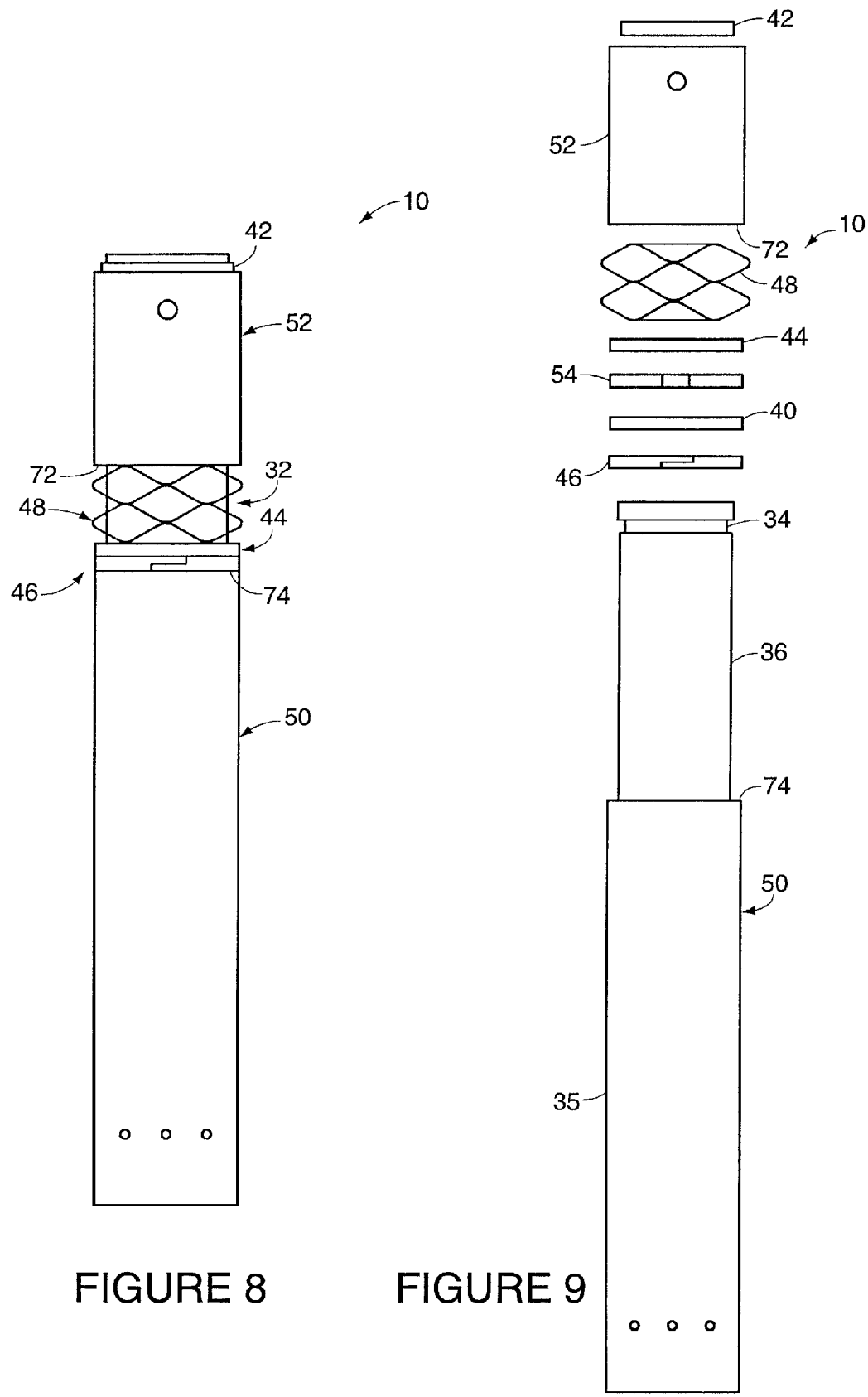
FIG. 8 shows an alternate embodiment of a displacer.
FIG. 9 illustrates an exploded view of the displacer of FIG. 8.

In one embodiment, as shown in FIGS. 8 and 9, the piston 10 includes a sleeve 52 that mounts on the body 50. The sleeve 52 acts to secure the seal ring 46 and spring 48 on the body 50 of the piston 10. The sleeve 52 forms the first groove wall 72 of the circumferential groove 36 of the body 50. Mounting the sleeve 52 on the body 50 compresses the spring 48. Compression or deflection of the spring 48 produces an axial load or force on the seal ring 46. Preferably, the load produced by the spring 48 on the seal ring 46 is between 5 and 10 pounds force. This load prevents shuttling of the seal ring 46 within the groove 32 during translation of the piston 10.

Preferably, the body 50 includes a first body portion 35 and a second body portion 36, where the second body portion 36 has a smaller outer diameter than the outer diameter of the first body portion 35. An end face of the first portion 35 of the body 50 forms the second groove wall 74 of the circumferential groove 36 body at the junction between the first 35 and second 36 portions. FIGS. 8 and 9 illustrate how, preferably, the sleeve 52 mounts to the second portion 36 of the body 50 wherein the sleeve 52 has an inner diameter larger than the outer diameter of the second portion 36, thereby allowing the sleeve 52 to slide over the second portion 36 of the body 50.

The body 50 also includes a securing mechanism receptacle 34 which aids in securing a sleeve 52 onto the body 50. Preferably, the securing mechanism receptacle 34 is a groove formed in the body 50; however, the securing mechanism receptacle 34 can include apertures, used for the attachment of screws or pins, for example. The piston 10 also includes a securing or sleeve attachment mechanism 42 to engage the securing mechanism receptacle 34. Preferably, the securing mechanism 42 is a snap ring; however, the securing mechanism can be screws or pins, for example. The securing mechanism 42 and securing mechanism receptacle 34 maintain the position of the sleeve 52 on the body 50 and also maintain the geometry of groove 32 formed between the first groove wall 72 of the sleeve 52 and the second groove wall 74 on the body 50. The securing mechanism 42 and receptacle 32 also maintain the compression of the spring 48 as created by the sleeve 52.

Because the location of the securing mechanism receptacle 34 and the securing mechanism 42 is approximately consistent among pistons 10, the compression or deflection of the spring 48 is controlled by the length of the sleeve 52. For example, a longer sleeve can produce a greater compression on the spring 48 than a shorter sleeve because the longer sleeve compresses the spring 48 to a greater degree than the shorter sleeve. The sleeve 52 is manufactured to a length such that compression of the spring 48 by the sleeve 52 causes the spring to produce a load between 5 and 10 lbs. on the seal ring 46.

When assembling the piston 10, the seal ring 46 and spring 48 are placed over the second portion 36 of the body 50. The seal ring 46 can include at least one radial spring within the seal ring 46. The sleeve 52 slides over the second portion 36 of the body 50, thereby compressing the spring 48 against the seal ring 46. Next, the securing mechanism 42 is inserted on the securing mechanism attachment portion 34 on the body 50 to secure the sleeve 52 to the body 50. Alternately, a load ring 44 can be placed between the spring 48 and seal ring 46 in the assembly process.

Figure 10:
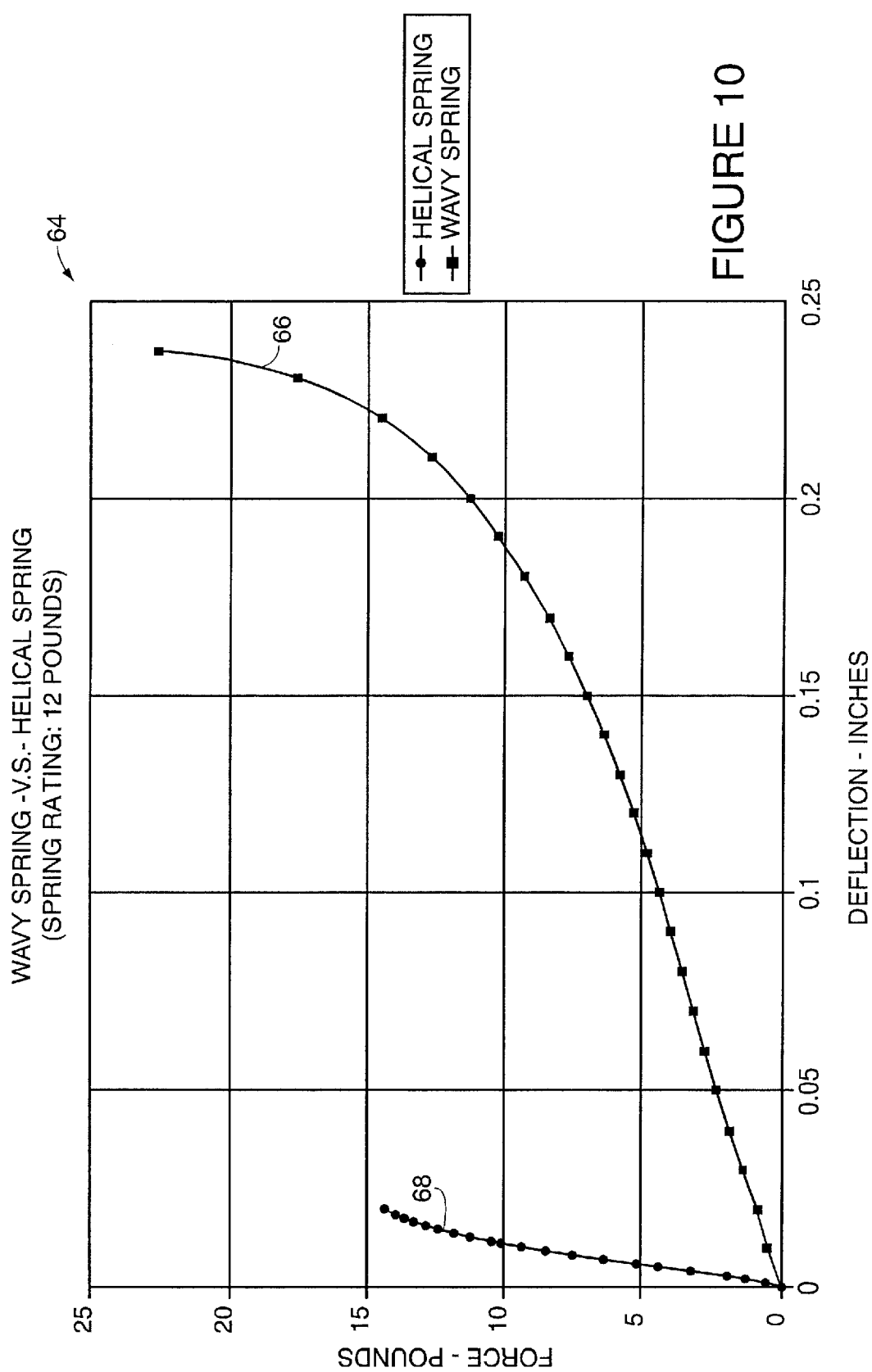
FIG. 10 illustrates the force-deflection curves for a spiral wave spring and a helical spring.

FIG. 10 illustrates a graph 64 showing the force-deflection relationship for a spiral wave spring 66 and a helical spring 68. The helical spring curve 68 shows that for small changes in deflection of the helical spring, large changes in the amount of force generated by the spring are produced. Conversely, the spiral wave spring curve 66 shows that for small changes in deflection of the spiral wave spring, small changes in the amount of force generated by the spring are produced.

The spiral wave spring is preferable for use in the piston 10 over the helical spring because a target force of between 5 and 10 pounds force can be more easily generated by the spiral wave spring compared to the helical spring. From the graph for the helical spring 68, compressing the helical spring causes large changes in force for relatively small changes in the deflection of the spring. A user can have difficulty in accurately producing a force in the helical spring within the range of 5 to 10 pounds. For example, the curve 68 shows that for a change in deflection of the helical spring by approximately 0.005 inches, the load created by the spring can vary by 5 pounds force. This load-deflection ratio does not allow for loading the spring within a narrow range or with a particular tolerance. Conversely, the spiral wave spring graph 66 shows that small compressions of the spiral wave spring leads to small changes in the forces generated by the spring. The use of a spiral wave spring is preferred over the use of a helical spring in the piston 10 because a user can gradually compress the spiral wave spring and obtain small increments in load. Therefore, the spiral wave spring allows the user to deflect the spring over a greater range to reach a desired load, as compared to the helical spring which allows the user to deflect the spring over a narrower range to achieve a desired load.

As portions of the piston 10 shrink upon exposure to a cold environment, such as in a refrigerator, the positioning of a spring within the piston 10 can change. These slight changes can be caused by a shrinking of the first and second walls of the groove 32 within the piston 10. This shrinking causes the spring to expand. Such expansion, however, does not greatly affect the amount of force generated by a wave spring on the seal assembly because of the relationship between force and deflection in the wave spring. Small changes in the expansion of the wave spring produces small changes in load. Conversely, expansion of the helical spring by a small amount can produce large changes in the load generated by the helical spring. Therefore, the use of a spiral wave spring within a cold environment is preferential to the use of a helical spring because the wave spring can maintain the load on the seal ring 46 within a narrower range or tolerance than the helical spring.

The spiral wave spring is also beneficial over the helical spring with respect to the relative height of the springs. The spiral wave spring has a non-loaded height of approximately 0.5 inches and can generate forces in the range of between 5 to 10 pounds required in the piston 10. Conversely, for a helical spring to generate similar loads, the non-loaded height of the helical spring is approximately 1 inch. Therefore, use of the spiral wave spring reduces the overall groove 32 height in the piston compared to the groove height required for the use of a helical spring.

FIG. 11 illustrates a comparison graph 70 of different types of springs used within a piston 10 to form an axial load or place an axial load on a seal ring 46. Force-deflection curves for a coil spring 96, such as a Bal-Spring TM (Bal Seal Engineering Co. Inc., Foothill Ranch, Calif.), a Belleville washer 58, a c-spring 62, a wavy washer 92 (Smalley Ring Co., Wheeling, Ill.), a dual wavy washer 98 and a spiral wave spring 94 (Smalley Ring Co., Wheeling, Ill.) are shown.

The curves for the coil spring 96, the Belleville washer 58 and the c-spring 62 illustrate force-deflection relationships where small changes in deflection produce large changes in force generated by the spring. The curve for the wavy washer 92 shows an initial force-deflection relationship where small changes in displacement of the washer produce small changes in the force created by the wavy washer. However, as the compression of the wavy washer increases beyond 0.050 inches, the force-displacement relationship increases such that small changes in displacement of the wavy washer produce large changes in the force generated by the wavy washer.

The dual wavy washer is formed by placing a first wavy washer on top of a second wavy washer in a node-to-node configuration. In this configuration, the nodes along the top surface of the first wavy washer contacts the nodes on the bottom surface of the second wavy washer. Preferably, the wavy washers that form the dual wavy washers are not secured to each other. The curve for the dual wavy spring 98 illustrates a shallow relationship or shallow slope between force and deflection, whereby small changes in deflection of the dual wavy washer creates small changes in force generated by the washer.

While the use of a dual wavy washer produces small changes in force with small changes in deflection, the curve for the spiral wave spring 94 illustrates a more shallow relationship between force and deflection compared to the dual wavy spring. For small changes in deflection of the wavy spring, smaller changes in force are produced in the wavy spring compared to that of the dual wave washers.

The comparison chart 70 illustrates that for a dual wavy washer or a spiral wave spring, small changes in displacement of the spring produces small changes in the force generated by the spring. The chart 70 also shows that a wavy washer can be used to produce a force-displacement relationship similar to the dual wavy washer for displacements up to 0.05 inches and for loads between 0 and approximately 10 pounds force.

While this invention has been particularly shown and described with references to preferred embodiments thereof, it will be understood by those skilled in the art that various changes in form and details may be made therein without departing from the scope of the invention encompassed by the appended claims.

What is claimed is:

1. A piston comprising:
   a body having a circumferential groove, the groove having a first groove wall and a second groove wall;
   a seal ring located against the first groove wall in the body; and
   a wave spring located between the seal ring and the second groove wall, the wave spring axially loading the seal ring.

2. The piston of claim 1 wherein the piston comprises a displacer.

3. The piston of claim 1 wherein the seal ring comprises a split seal ring.

4. The piston of claim 1 wherein the seal ring comprises at least one radial spring mounted within the seal ring to create a radial force within the seal ring.

5. The piston of claim 4 wherein the at least one radial spring comprises a first radial spring and a second radial spring.

6. The piston of claim 5 wherein the first radial spring comprises a first opening and the second radial spring comprises a second opening wherein the first radial spring and the second radial spring are mounted within the seal ring such that the first opening is located at approximately 180 degrees with respect to the second opening.

7. The piston of claim 1 further comprising a load ring mounted between the wave spring and the seal ring wherein the load ring distributes the axial load created by the wave spring onto the seal ring.

8. The piston of claim 1 wherein the body comprises a sleeve mounted on the body, the sleeve forming the first groove wall of the circumferential groove and the body forming the second groove wall of the circumferential groove.

9. The piston of claim 8 wherein the piston comprises a securing mechanism that secures the sleeve to the body.

10. The piston of claim 9 wherein the securing mechanism comprises a snap ring.

11. The piston of claim 1 wherein the wave spring comprises a spiral wave spring.

12. The piston of claim 1 wherein the wave spring comprises at least one wavy washer.

13. A refrigerator comprising:
a cylinder;
a displacer mounted within the cylinder, the displacer having a body having a circumferential groove, the groove having a first groove wall and a second groove wall;
a seal ring located against the first groove wall in the body; and
a wave spring located between the seal ring and the second groove wall, the wave spring axially loading the seal ring.

14. The refrigerator of claim 13 wherein the seal ring comprises a split seal ring.

15. The refrigerator of claim 13 wherein the seal ring comprises at least one radial spring mounted within the seal ring to create a radial force within the seal ring.

16. The refrigerator of claim 15 wherein the at least one radial spring comprises a first radial spring and a second radial spring.

17. The refrigerator of claim 16 wherein the first radial spring comprises a first opening and the second radial spring comprises a second opening wherein the first radial spring and the second radial spring are mounted within the seal ring such that the first opening is located at approximately 180 degrees with respect to the second opening.

18. The refrigerator of claim 13 further comprising a load ring mounted between the wave spring and the seal ring wherein the load ring distributes the axial load created by the wave spring onto the seal ring.

19. The refrigerator of claim 13 wherein the body comprises a sleeve mounted on the body, the sleeve forming the first groove wall and the body forming the second groove wall of the circumferential groove.

20. The refrigerator of claim 19 wherein the displacer comprises a securing mechanism that secures the sleeve to the body.

21. The refrigerator of claim 20 wherein the securing mechanism comprises a snap ring.

22. The refrigerator of claim 13 wherein the wave spring comprises a spiral wave spring.

23. The refrigerator of claim 13 wherein the wave spring comprises at least one wavy washer.

24. A refrigerator comprising:
a cylinder;
a displacer mounted within the cylinder, the displacer having a body and a sleeve mounted on the body, the sleeve forming a first groove wall and the body forming a second groove wall, the first groove wall and second groove wall defining a circumferential groove in the body;
a seal ring located against the first groove wall in the body; and
a spring located between the seal ring and the second groove wall, the spring axially loading the seal ring.

25. The refrigerator of claim 24 wherein the seal ring comprises a split seal ring.

26. The refrigerator of claim 24 wherein the seal ring comprises at least one radial spring mounted within the seal ring to create a radial force within the seal ring.

27. The refrigerator of claim 26 wherein the at least one radial spring comprises a first radial spring and a second radial spring.

28. The refrigerator of claim 27 wherein the first radial spring comprises a first opening and the second radial spring comprises a second opening wherein the first radial spring and the second radial spring are mounted within the seal ring such that the first opening is located at approximately 180 degrees with respect to the second opening.

29. The refrigerator of claim 24 further comprising a load ring mounted between the spring and the seal ring wherein the load ring distributes the axial load created by the spring onto the seal ring.

30. The refrigerator of claim 24 wherein the displacer comprises a securing mechanism that secures the sleeve to the body.

31. The refrigerator of claim 30 wherein the securing mechanism comprises a snap ring.

32. The refrigerator of claim 24 wherein the spring comprises a wave spring.

33. The refrigerator of claim 32 wherein the wave spring comprises a spiral wave spring.

34. The refrigerator of claim 32 wherein the wave spring comprises at least one wavy washer.

35. A refrigerator comprising:
a cylinder;
a displacer mounted within the cylinder, the displacer having a body having a circumferential groove, the groove having a first groove wall and a second groove wall;
a split seal ring mounted against the first groove wall, the split seal ring having at least one radial spring mounted within the split seal ring to create a radial force of the split seal ring against the cylinder; and
a wave spring located between the split seal ring and the second groove wall, the wave spring axially loading the split seal ring.

36. The refrigerator of claim 35 further comprising a load ring mounted between the wave spring and the split seal ring wherein the load ring distributes the axial load created by the wave spring on to the split seal ring.

37. The refrigerator of claim 35 wherein the body comprises a sleeve mounted on the body, the sleeve forming the first groove wall and the body forming the second groove wall of the circumferential groove.

38. The refrigerator of claim 37 wherein the displacer comprises a securing mechanism that secures the sleeve to the body.

39. The refrigerator of claim 38 wherein the securing mechanism comprises a snap ring.

40. The refrigerator of claim 35 wherein the at least one radial spring comprises a first radial spring and a second radial spring.

41. The refrigerator of claim 40 wherein the first radial spring comprises a first opening and the second radial spring comprises a second opening wherein the first radial spring and the second radial spring are mounted within the seal ring such that the first opening is located at approximately 180 degrees with respect to the second opening.

42. The refrigerator of claim 35 wherein the wave spring comprises a spiral wave spring.

43. The refrigerator of claim 35 wherein the wave spring comprises at least one wavy washer.

44. A method for securing a seal ring within a piston comprising:

provinding a piston having a body and a sleeve mounted on the body, the body forming a first circumferential groove wall in the piston;

providing a seal ring against the first groove wall of the piston;

providing a wave spring adjacent to the seal ring;

compressing the wave spring with a sleeve to axially load the split ring, the sleeve forming a second circumferential groove wall; and attaching the sleeve to the body to maintain the compression of the wave spring.

45. The method of claim 44 further comprising providing a load ring between the wave spring and seal ring.

46. The method of claim 44 further comprising providing at least one radial spring within the seal ring.

47. The method of claim 44 further comprising providing a securing mechanism to attach the sleeve to the body.

* * * * *